United States Patent
Silberling et al.

(10) Patent No.: US 10,585,429 B2
(45) Date of Patent: Mar. 10, 2020

(54) ROBOTIC STEERING CONTROLLER FOR OPTIMAL FREE RESPONSE EVALUATION

(71) Applicant: Dynamic Research, Inc., Torrance, CA (US)

(72) Inventors: Jordan Y Silberling, Redondo Beach, CA (US); Nadine A Wong, Redondo Beach, CA (US); Brian K Kebschull, San Pedro, CA (US); Joseph Kelly, Lakewood, CA (US); Stephen Rhim, Lakewood, CA (US)

(73) Assignee: DYNAMIC RESEARCH, INC., Torrance, CA (US)

( * ) Notice: Subject to any disclaimer, the term of this patent is extended or adjusted under 35 U.S.C. 154(b) by 199 days.

(21) Appl. No.: 15/671,976

(22) Filed: Aug. 8, 2017

(65) Prior Publication Data

US 2019/0041847 A1 Feb. 7, 2019

Related U.S. Application Data

(60) Provisional application No. 62/539,652, filed on Aug. 1, 2017.

(51) Int. Cl.
*G05D 1/00* (2006.01)
*B62D 15/02* (2006.01)

(52) U.S. Cl.
CPC ......... *G05D 1/0011* (2013.01); *B62D 15/025* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,007,709 A | * | 11/1961 | Munson | |
| 5,020,754 A | * | 6/1991 | Davis | B60J 1/20 248/205.8 |
| 2005/0166413 A1 | * | 8/2005 | Crampton | B25J 13/088 33/503 |
| 2006/0267932 A1 | * | 11/2006 | Rosenberg | A63F 13/06 345/156 |
| 2007/0193798 A1 | * | 8/2007 | Allard | B60T 7/22 180/169 |
| 2008/0004634 A1 | * | 1/2008 | Farritor | A61B 1/00158 606/130 |
| 2008/0042329 A1 | * | 2/2008 | Deal | B60G 3/01 267/2 |

(Continued)

OTHER PUBLICATIONS

International Search Report and Written Opinion dated Oct. 1, 2018 in PCT/US2018/042139 (11 pages).

*Primary Examiner* — Redhwan K Mawari
(74) *Attorney, Agent, or Firm* — Manuel de la Cerra

(57) ABSTRACT

A steering robot for operating a steering wheel of a test automobile is disclosed. The robot includes an actuator mounted to the automobile, and an electromechanical connector that detachably connects the actuator to the steering wheel. A steering processor is connected to the actuator and to the electromechanical connector, and the steering processor (1) actuates the actuator, thereby operating the steering wheel when the actuator is connected to the steering wheel by way of the electromechanical connector; and (2) actuates the electromechanical connector, thereby disconnecting the actuator from the steering wheel.

27 Claims, 16 Drawing Sheets

(56) References Cited

U.S. PATENT DOCUMENTS

| | | | | |
|---|---|---|---|---|
| 2008/0197293 A1* | 8/2008 | Xu | ............................ | B62D 1/00 |
| | | | | 250/491.1 |
| 2012/0024617 A1* | 2/2012 | Markfort | ................... | B62D 1/10 |
| | | | | 180/444 |
| 2012/0232780 A1* | 9/2012 | Delson | ..................... | A63F 13/06 |
| | | | | 701/400 |
| 2013/0018526 A1* | 1/2013 | Kelly | ................. | G01M 17/0078 |
| | | | | 701/2 |
| 2013/0061558 A1* | 3/2013 | Klear | ...................... | B65B 51/06 |
| | | | | 53/218 |
| 2013/0118292 A1* | 5/2013 | Sulser | .................... | B62D 1/184 |
| | | | | 74/493 |
| 2016/0377508 A1* | 12/2016 | Perrone | ................. | G01M 17/06 |
| | | | | 180/204 |

* cited by examiner

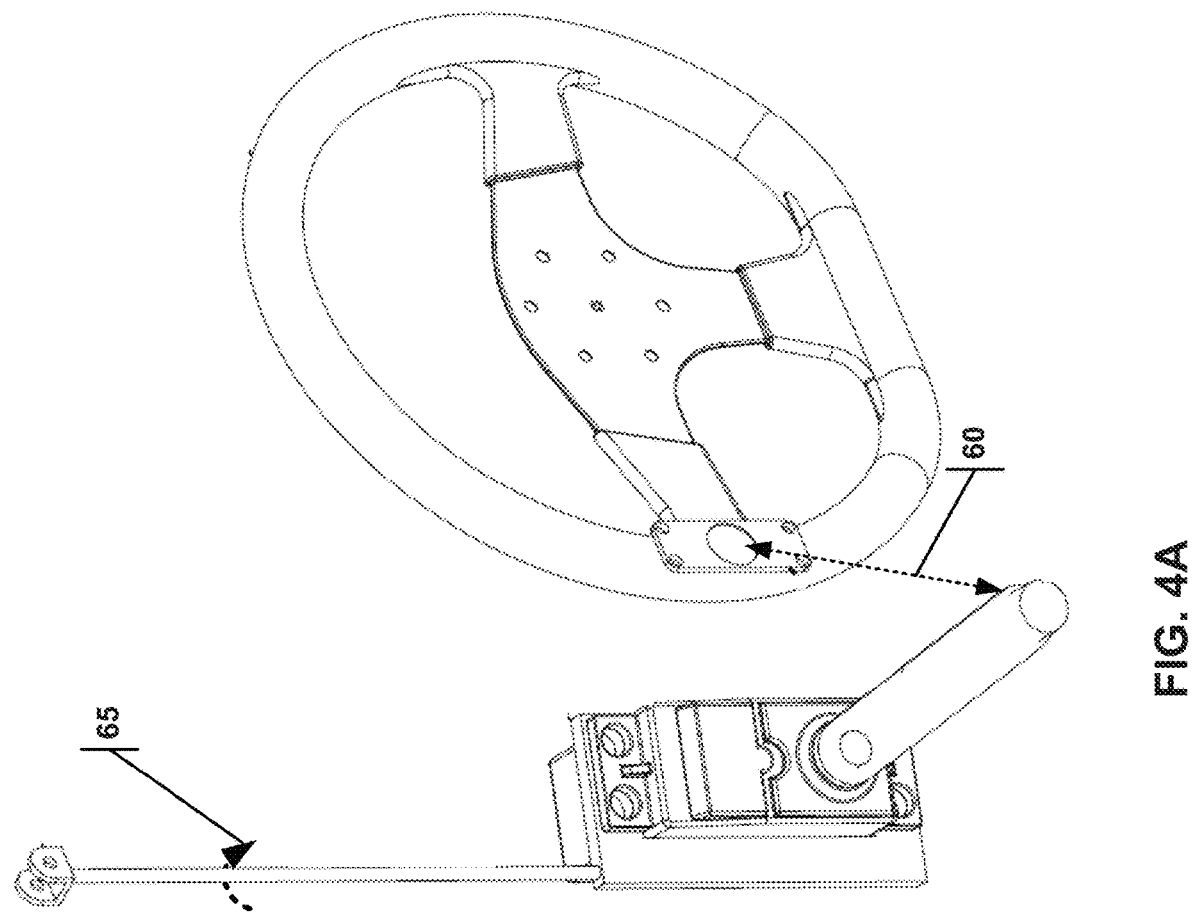

ROBOTIC STEERING CONTROLLER FOR OPTIMAL FREE RESPONSE EVALUATION

RELATED APPLICATIONS

The present application claim priority to U.S. Provisional Patent Application No. 62/539,652, filed on Aug. 1, 2017, all of the contents of which are incorporated herein by reference, including all tables, figures and claims.

The present invention is related to U.S. patent application Ser. No. 14/062,287, filed Oct. 24, 2013, which claims benefit of U.S. Provisional Application No. 61/874,274, filed Sep. 5, 2013, and claims benefit of U.S. Provisional Application No. 61/874,267, filed Sep. 5, 2013, and claims benefit of U.S. Provisional Application No. 61/874,264, filed Sep. 5, 2013, and which is a continuation-in-part application of U.S. patent application Ser. No. 13/532,417, filed Jun. 25, 2012, now U.S. Pat. No. 8,583,358, issued Nov. 12, 2013, and which is a continuation-in-part application of U.S. patent application Ser. No. 13/532,430, filed Jun. 25, 2012, now U.S. Pat. No. 8,589,062, issued Nov. 19, 2013, which claims benefit of U.S. Provisional Application No. 61/507,539, filed Jul. 13, 2011, and claims benefit of U.S. Provisional Application No. 61/578,452, filed Dec. 21, 2011, and which is a continuation-in-part application of U.S. patent application Ser. No. 13/357,526, filed Jan. 24, 2012, now U.S. Pat. No. 8,447,509, issued May 21, 2013, and which claims benefit of U.S. Provisional Application No. 61/621,597, filed Apr. 9, 2012, and which claims benefit of U.S. Provisional Application No. 61/639,745, filed Apr. 27, 2012, all of which are hereby incorporated herein by reference in their entirety including all tables, figures and claims. U.S. patent application Ser. No. 14/062,287 is also a continuation-in-part of U.S. patent application Ser. No. 14/050,039, filed Oct. 9, 2013, and is a continuation-in-part application of U.S. patent application Ser. No. 14/050,048, filed Oct. 9, 2013, all of which are hereby incorporated herein by reference in their entirety including all tables, figures and claims. The present invention is related to U.S. patent application Ser. No. 15/643,079, filed on Jul. 6, 2017, which claims priority to U.S. Patent Application 62/359,929, filed on Jul. 8, 2016, both of which are hereby incorporated herein by reference in their entirety including all tables, figures and claims. The present invention is related to U.S. patent application Ser. No. 15/408,759, filed on Jan. 18, 2017, which claims priority to U.S. Patent Application 62/429,785, filed on Dec. 3, 2016, both of which are hereby incorporated herein by reference in their entirety, including all tables, figures and claims.

TECHNICAL FIELD

The present invention relates to devices and systems for testing automobile safety functions, features and technologies.

BACKGROUND

Many new vehicles are outfitted with automatic or driver-assistive steering systems, such as Lane Keeping Systems (LKS) or automatic steering functions. Such systems assist the driver in staying within a given roadway lane by, for example, exerting a low level of torque to the vehicle's steering system or applying differential braking to the wheels.

There currently exist robotic steering controllers for use in highly dynamic vehicle evaluations, where high levels of steering torque, large steering angles and high angular rates are required. These robotic steering controllers generally comprise a direct-drive or geared motor mounted to a vehicle's steering wheel, and are equipped with a load reaction mechanism to react the steering loads through rods, or other linkages attached to vehicle structure, windshield, etc. These systems generally have large self-inertia, damping, and friction characteristics, which affect the free response characteristics of the vehicle's steering system while they are installed or connected to the steering wheel. When evaluating an LKS, the contribution of the robotic steering controller's own dynamics can affect the performance of the LKS, which is undesirable.

In order to use existing robotic steering controllers for these types of evaluations, the undesirable effects of the robotic controller's own inertia, damping and friction characteristics must be accepted or electronically compensated through the use of high-fidelity torque sensors, high bandwidth controllers and inertia/damping/friction compensation algorithms. Such systems tend to be fairly expensive and complex, and often require careful tuning in order to minimize the effect of the robotic steering controller on the vehicle's own steering system dynamics. In many cases, the effect of the robotic steering controller cannot be completely eliminated through tuning, due to minute variations in the controller's own friction or damping characteristics resulting from wear, temperature changes, or other factors, and the controller consequently continues to exert residual torque on the vehicle's steering system, disturbing its free response.

Therefore a need exists to measure the free response of the steering/vehicle system without affecting its dynamics. Further, a novel approach to a robotic steering controller is needed to facilitate the evaluation of such systems in a precisely controlled manner.

SUMMARY

The present invention provides an elegant solution to the needs described above and offers numerous additional benefits and advantages, as will be apparent to persons of skill in the art. In one aspect, a steering robot for operating a steering wheel of a test automobile is disclosed. The robot includes an actuator mounted to the automobile and an electromechanical connector that detachably connects the actuator to the steering wheel. A steering processor is connected to the actuator and to the electromechanical connector, and the steering processor (1) actuates the actuator, thereby operating the steering wheel when the actuator is connected to the steering wheel by way of the electromechanical connector; and (2) actuates the electromechanical connector, thereby disconnecting the actuator from the steering wheel. The actuator may have an inertia, and when the actuator is connected to the steering wheel, the steering wheel experiences the inertia, but when the electromechanical connector is actuated, the inertia is decoupled from the steering wheel. The processor may perform step (1) and then step (2) while the test automobile is moving. A remote control may control the steering processor through a wireless signal. The steering robot may also have a connection structure that transfers the torque from the actuator to the steering wheel, and that structure may be an actuator arm, a shaft, or a plate.

The electromechanical connector may be an electromagnet attracted to a piece of metal, wherein the actuation of the electromechanical connector includes deactivation of the electromagnet such that the electromagnet is not attracted to the piece of metal. Alternatively, the electromechanical connector may be a pin inserted into a slot, wherein the actuation of the electromechanical connector includes removing the pin from the slot. In another alternative, the electromechanical connector may be a pincer.

The actuator may be under an actuator detachment force, but the connection of the actuator to the steering wheel (via the electromechanical connector) is sufficient to overcome the force. When the electromechanical connector is actuated, the actuator detachment force moves the electromechanical connector away from the steering wheel.

The actuator may be connected to the automobile by a bracing rod and automobile mount. The test automobile may also have an automobile processor connected to automobile sensors, and the steering processor may be connected to the automobile processor.

A method for testing an automobile's safety functions with a steering robot is also disclosed. The method includes (a) providing a steering robot connected to a steering wheel of the test automobile, the robot having an inertia and coupled to the steering wheel; (b) driving the test automobile; (c) while driving, actuating the robot to operate the steering wheel; (d) while driving, decoupling the robot from the steering wheel, thereby decoupling the inertia from the steering wheel; and (e) evaluating the automobile safety functions. The actuation of the robot in step (c) may be sufficient to direct the test automobile out of its current lane. Steps (c) and (d) may be controlled by a processor, and that processor need not be on board the test automobile. The method can be used to test automobile safety functions such as, but not limited to, a lane keeping system, an autonomous driving system or a semi-autonomous driving system.

Additional aspects, alternatives and variations as would be apparent to persons of skill in the art are also disclosed herein and are specifically contemplated as included as part of the invention. The invention is set forth only in the claims as allowed by the patent office in this or related applications, and the following summary descriptions of certain examples are not in any way to limit, define or otherwise establish the scope of legal protection.

BRIEF DESCRIPTION OF THE DRAWINGS

The invention can be better understood with reference to the following figures. The components within the figures are not necessarily to scale, emphasis instead being placed on clearly illustrating example aspects of the invention. In the figures, like reference numerals designate corresponding parts throughout the different views and/or embodiments. Furthermore, various features of different disclosed embodiments can be combined to form additional embodiments, which are part of this disclosure. It will be understood that certain components and details may not appear in the figures to assist in more clearly describing the invention.

FIG. 4A shows the steering robot detached from a steering wheel.

DETAILED DESCRIPTION

Figure 1:
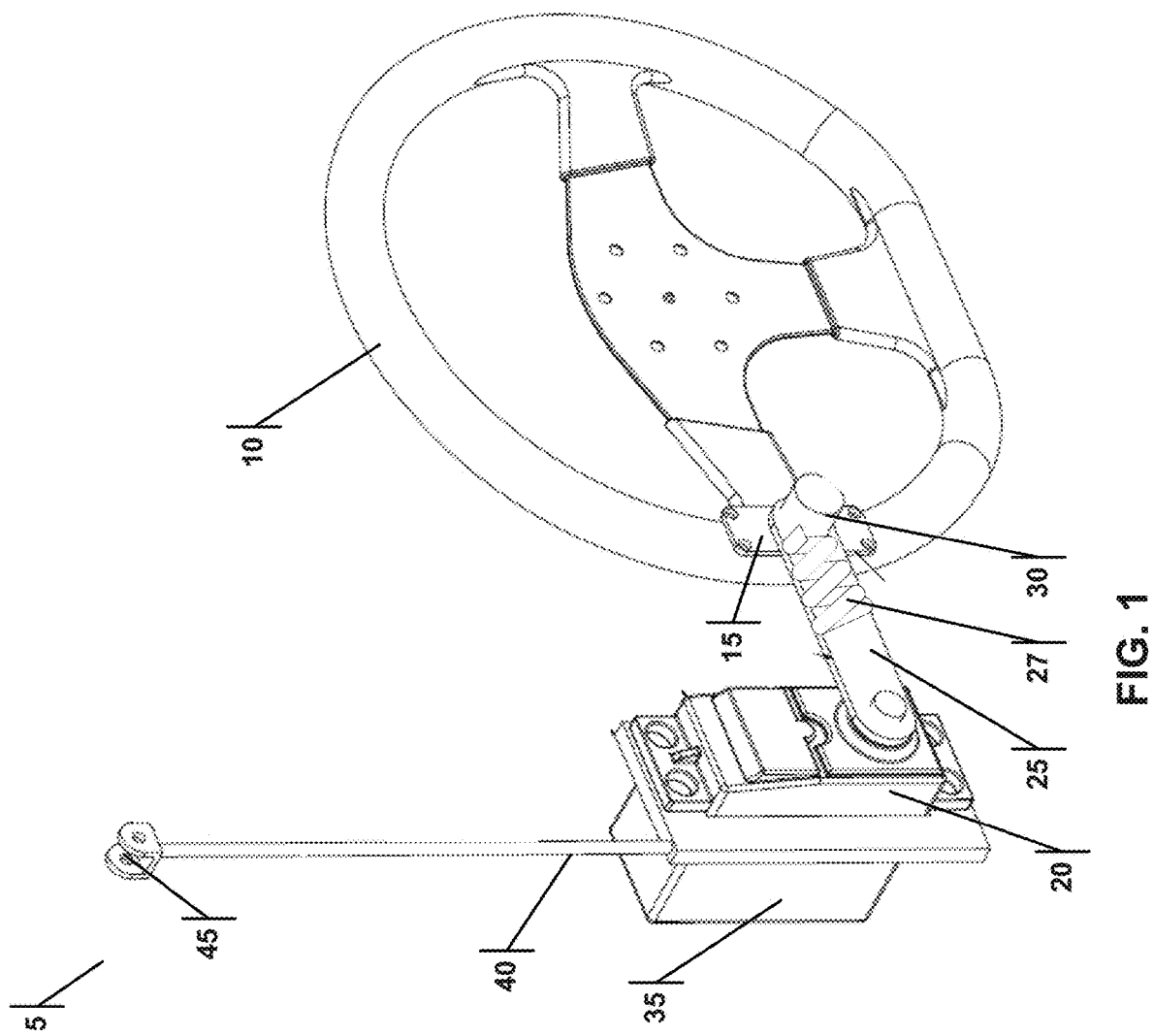
FIG. 1 shows the steering robot attached to a steering wheel by means of an electromechanical connector and an actuator arm.
Figure 2:
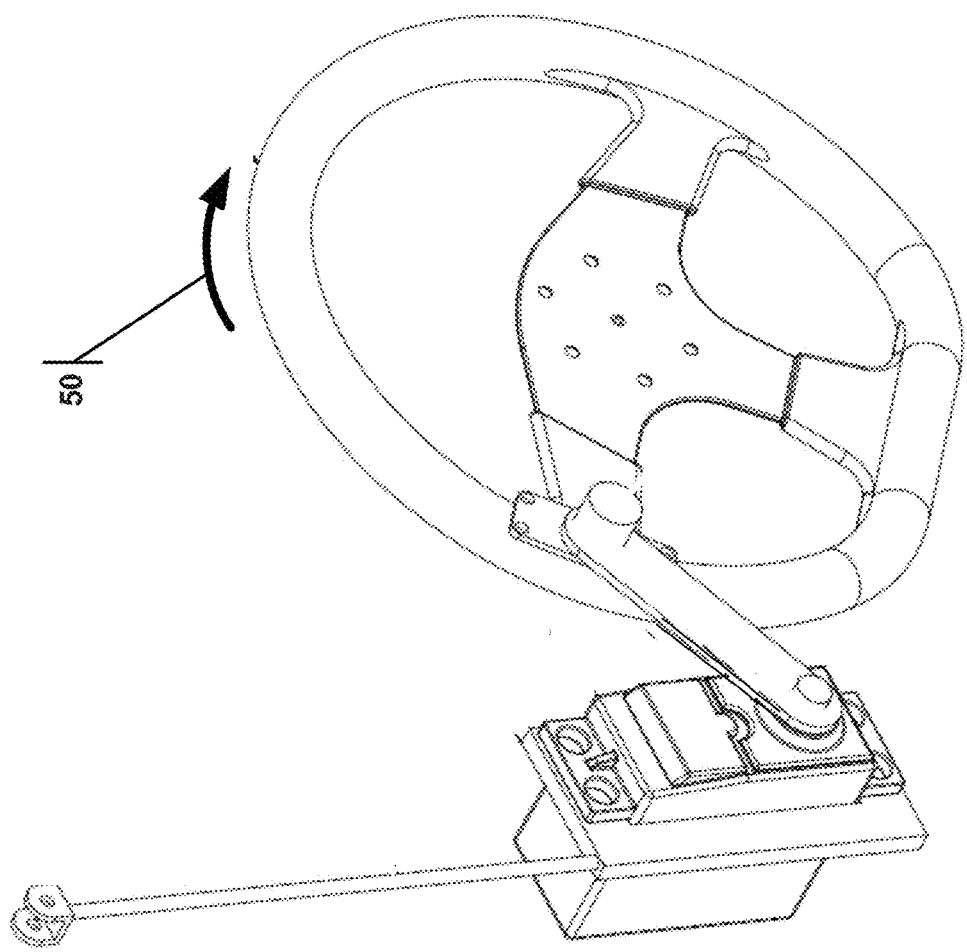
FIG. 2 shows the steering robot turning the steering wheel in one direction.
Figure 3:
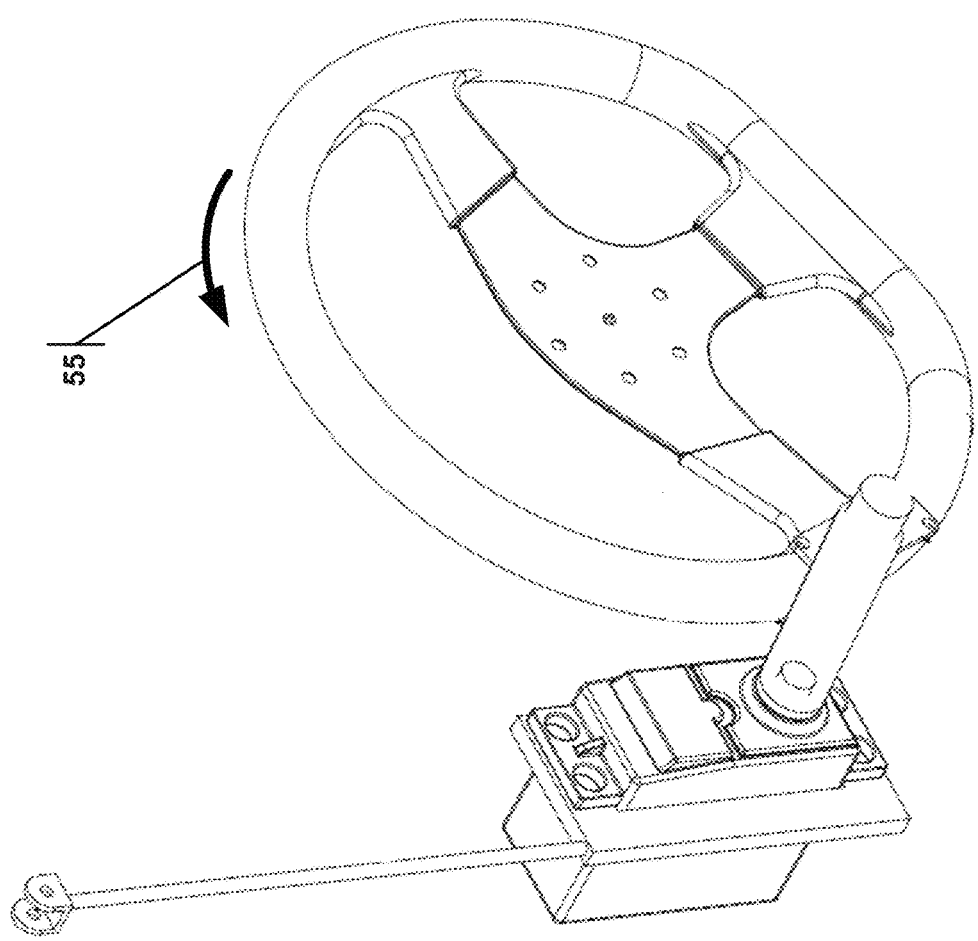
FIG. 3 shows the steering robot turning the steering wheel in the opposite direction of FIG. 2.

Reference is made herein to some specific examples of the present invention, including any best modes contemplated by the inventor for carrying out the invention. Examples of these specific embodiments are illustrated in the accompanying figures. While the invention is described in conjunction with these specific embodiments, it will be understood that it is not intended to limit the invention to the described or illustrated embodiments. To the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, process operations well known to persons of skill in the art have not been described in detail in order not to obscure unnecessarily the present invention. Various techniques and mechanisms of the present invention will sometimes be described in singular form for clarity. However, it should be noted that some embodiments include multiple iterations of a technique or multiple mechanisms unless noted otherwise. Similarly, various steps of the methods shown and described herein are not necessarily performed in the order indicated, or performed at all in certain embodiments. Accordingly, some implementations of the methods discussed herein may include more or fewer steps than those shown or described. Further, the techniques and mechanisms of the present invention will sometimes describe a connection, relationship or communication between two or more entities. It should be noted that a connection or relationship between entities does not necessarily mean a direct, unimpeded connection, as a variety of other entities or processes may reside or occur between any two entities. Consequently, an indicated connection does not necessarily mean a direct, unimpeded connection, unless otherwise noted.

The following list of example features corresponds with FIGS. 1-13 and is provided for ease of reference, where like reference numerals designate corresponding features throughout the specification and figures:

Steering Robot 5
Steering Wheel 10
Steering Wheel Bracket 15
Steering Wheel Bracket (first embodiment) 15A
Steering Wheel Bracket (second embodiment) 15B
Steering Wheel Bracket (third embodiment) 15C
Steering Wheel Bracket (shaft coupler design first embodiment) 15D
Steering Wheel Bracket (shaft coupler design second embodiment) 15E
Steering Wheel Bracket Connector Structure (first embodiment) 15AA
Steering Wheel Bracket Connector Structure (second embodiment) 15BB
Steering Wheel Bracket Connector Structure (third embodiment) 15CC
Steering Wheel Bracket Connector Structure (shaft coupler design first embodiment) 15DD
Steering Wheel Bracket Connector Structure (shaft coupler design second embodiment) 15EE
Actuator 20
Actuator Arm (connection structure) 25
Actuator Shaft (connection structure) 25B
Compliant Coupling 27
Electromechanical Connector 30
Electromechanical Connector (first embodiment, actuator connection structure side) 30A
Electromechanical Connector (second embodiment, actuator connection structure side) 30B
Electromechanical Connector (third embodiment, actuator connection structure side) 30C
Electromechanical Connector (fourth embodiment) 30D
Electromechanical Connector (shaft coupler design first embodiment) 30E
Electromechanical Connector (shaft coupler design second embodiment) 30F
Actuator Bracket 35
Bracing Rod 40
Bracing Rod Mount 45
Robot Steering Rotation 50
Opposite Robot Steering Rotation 55
Actuator Detachment 60
Actuator Detachment Force 65
Gravity detachment Force 65A
Rotational Spring Biased Force 65B
Translational Spring Biased Force 65C
Electro/mechanical Connector Actuation (first embodiment) 70A
Electro/mechanical Connector Actuation (second embodiment) 70B
Electro/mechanical Connector Actuation (third embodiment) 70C
Electro/mechanical Connector Actuation (fourth embodiment) 70D
Electro/mechanical Connector Actuation (fifth embodiment) 70E
Electro/mechanical Connector Actuation (sixth embodiment) 70F
Steering Processor 75
Automobile Processor/Sensors 80
Remote Processor/Controller 85
Electro/Mechanical Connector Control Line 90
Actuator Control Line 95
Automobile Mount 100
Rotational Plane of Actuator 105
Rotational Plane of Steering Wheel 110
Method of evaluating the free response of a test automobile's safety functions 200
Steps to the method of 200 205-230

In order to minimize or eliminate the steering robot's effect on the free response dynamics of the steering/vehicle system, it is necessary to decouple the steering robot from the steering wheel as completely as possible. The present innovation achieves this through the use of an electronic or mechanical (electromechanical) connector between the robotic control actuator and the steering wheel. This design provides precise, on-center, and small angle path-following steering control, as well as precise open-loop steering inputs. Further, the quick disconnect of the actuator from the steering wheel when prescribed conditions are met (e.g., at a given point along a path, at a given yaw rate, path curvature, etc.), minimizes the inertial and other effects of the actuator and its mechanical attachments on the free response of the steering/vehicle system.

The system described here may use a commercial grade angular motion electromechanical servo actuator. As should be recognized, the actuator may be of any type that creates rotational or translational movement that can be transferred to the steering wheel. Non-limiting types of actuators include: hydraulic, pneumatic, mechanical, electrical, thermal, magnetic, and vacuum actuators (these actuators may be combinations of the foregoing, as well; for example, a vacuum-assisted mechanical or electro-hydraulic actuator). In a preferred embodiment, the electromechanical servo actuator is mounted to the automobile, for example, by a rod that is connected to the windshield by means of a suction cup. An electromechanical connector is attached to the end of the servo arm and may attach to a small steering wheel bracket, which is secured to the vehicle's steering wheel rim via light-weight tie-wraps. In another embodiment, the actuator can be connected to the steering wheel (or steering wheel nut) through the use of a shaft in torsion. The connection structure is intended to transfer the torque from the actuator to the steering wheel.

Referring now to FIGS. 1 through 4, a steering robot 5 for operating a steering wheel 10 of a test automobile is shown. The robot 5 includes an actuator 20 (illustrated as a servo) mounted to the automobile. The actuator may be housed in a bracket 35 that has a bracing rod 40 extending therefrom. At the end of the bracing rod is a bracing rod mount 45 that connects to an automobile mount 100, shown in FIGS. 7-11. A non-limiting example of the automobile mount is a suction cup that may connect to the test automobile's windshield.

A connection structure—i.e., actuator arm 25—is connected to the actuator 20, which has an electromechanical connector 30 that temporarily connects the actuator arm 25 to the steering wheel 10. Optionally, the steering wheel 10 may have a lightweight steering wheel bracket 15 that is the connection point to the electromechanical connector 30. The actuator arm 25 is depicted as a longitudinal rod, but it need not be so; rather, the actuator arm 25 may be used to amplify the rotational movement of the actuator 20 by connecting the to the rotational axis of the actuator 20 at one location on the actuator arm 25 and connecting to the electromechanical connector 30 at another location on the actuator arm 25. Therefore, the actuator arm 25 may be shaped more like a plate, if necessary. Further, the actuator arm 25 need not be used; rather, the actuator 20 may be connected to the steering wheel 10 through other types of connection structures, such as a shaft, discussed in more detail below with respect to FIGS. 12A through 12D.

Figure 8:
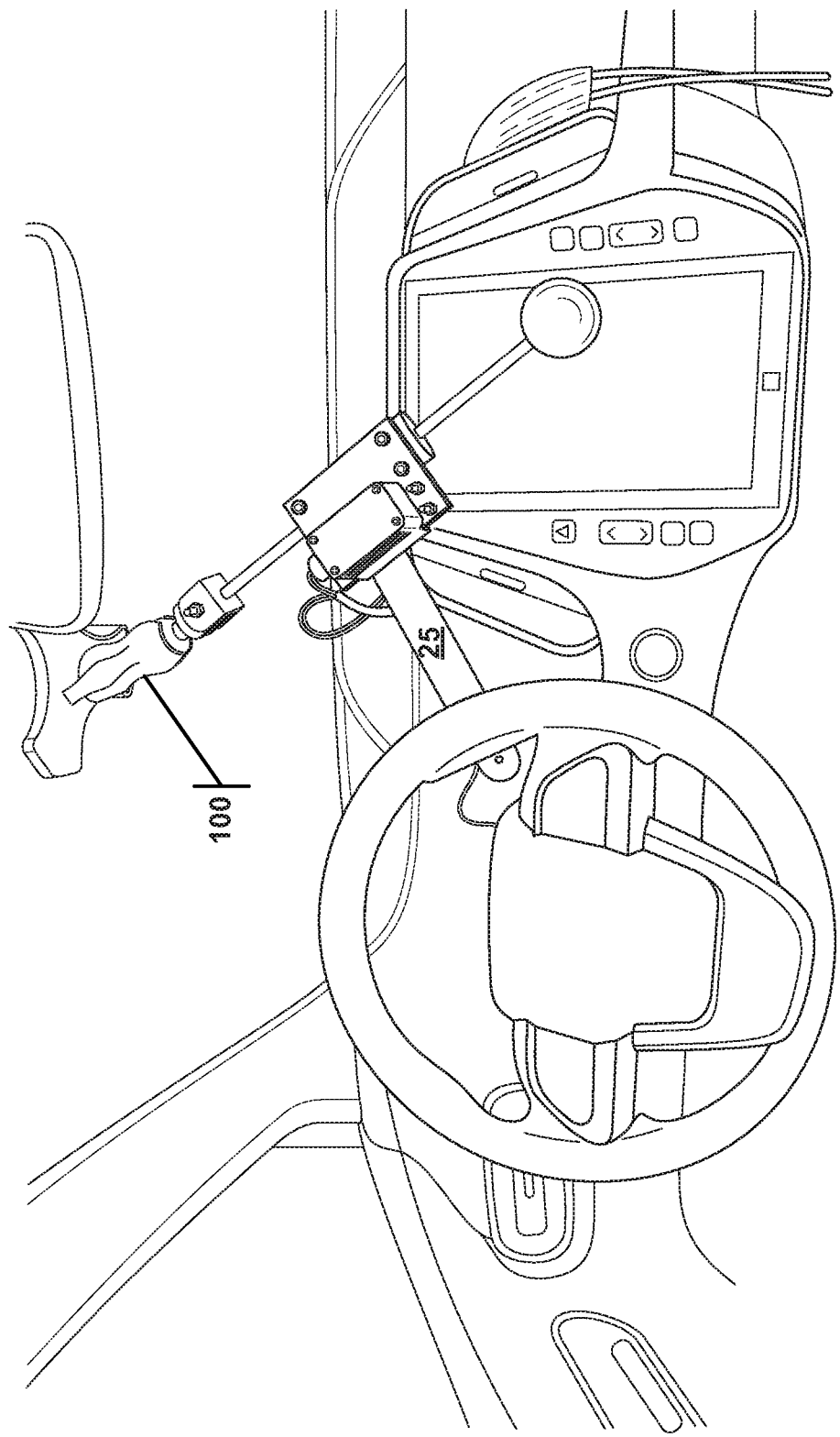
FIG. 8 is a line drawing from a photograph of the steering robot connected to a steering wheel by means of an electromechanical connector.
Figure 9:
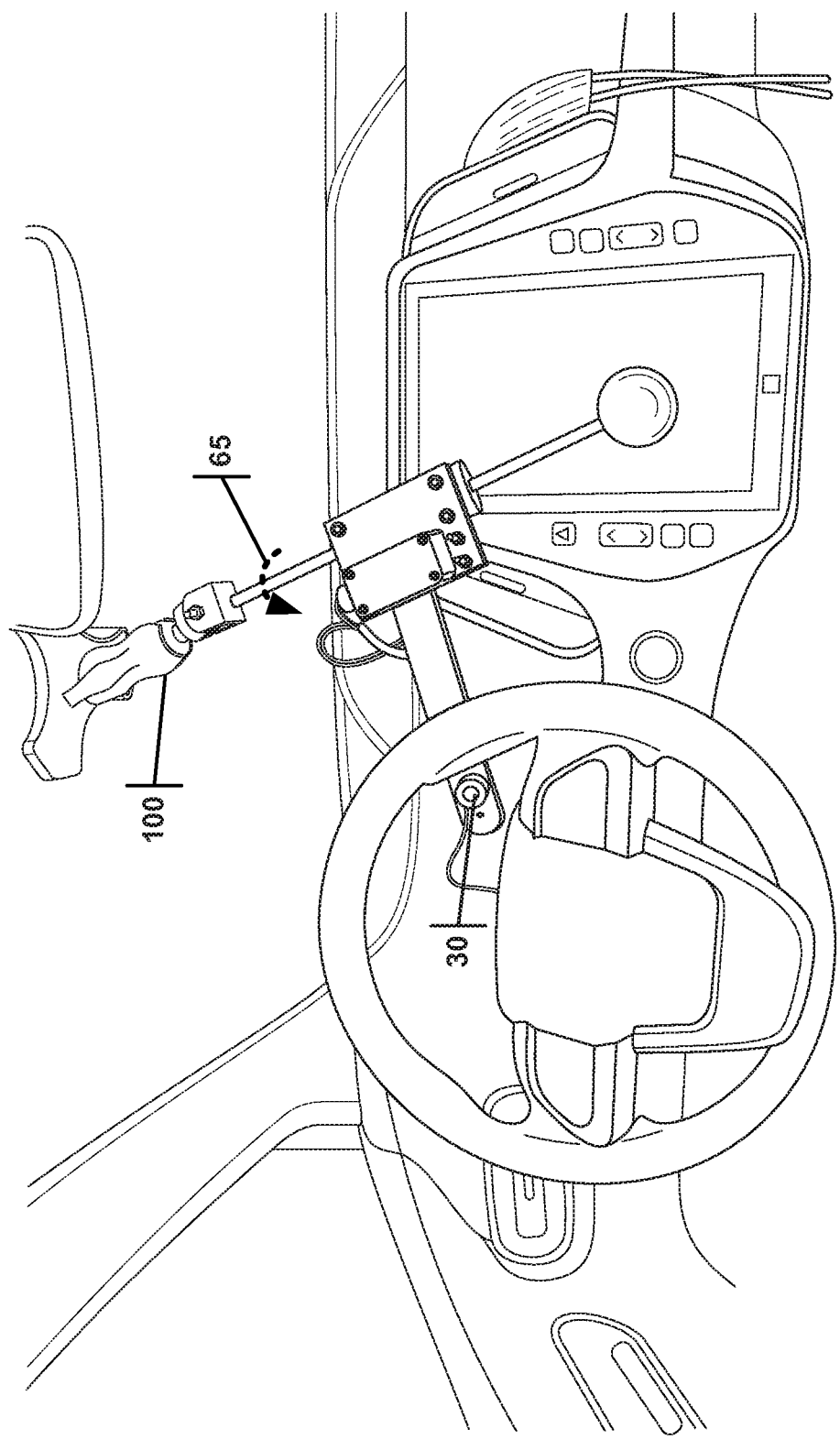
FIG. 9 is a line drawing from a photograph of the steering robot just after it has detached from the steering wheel.
Figure 10:
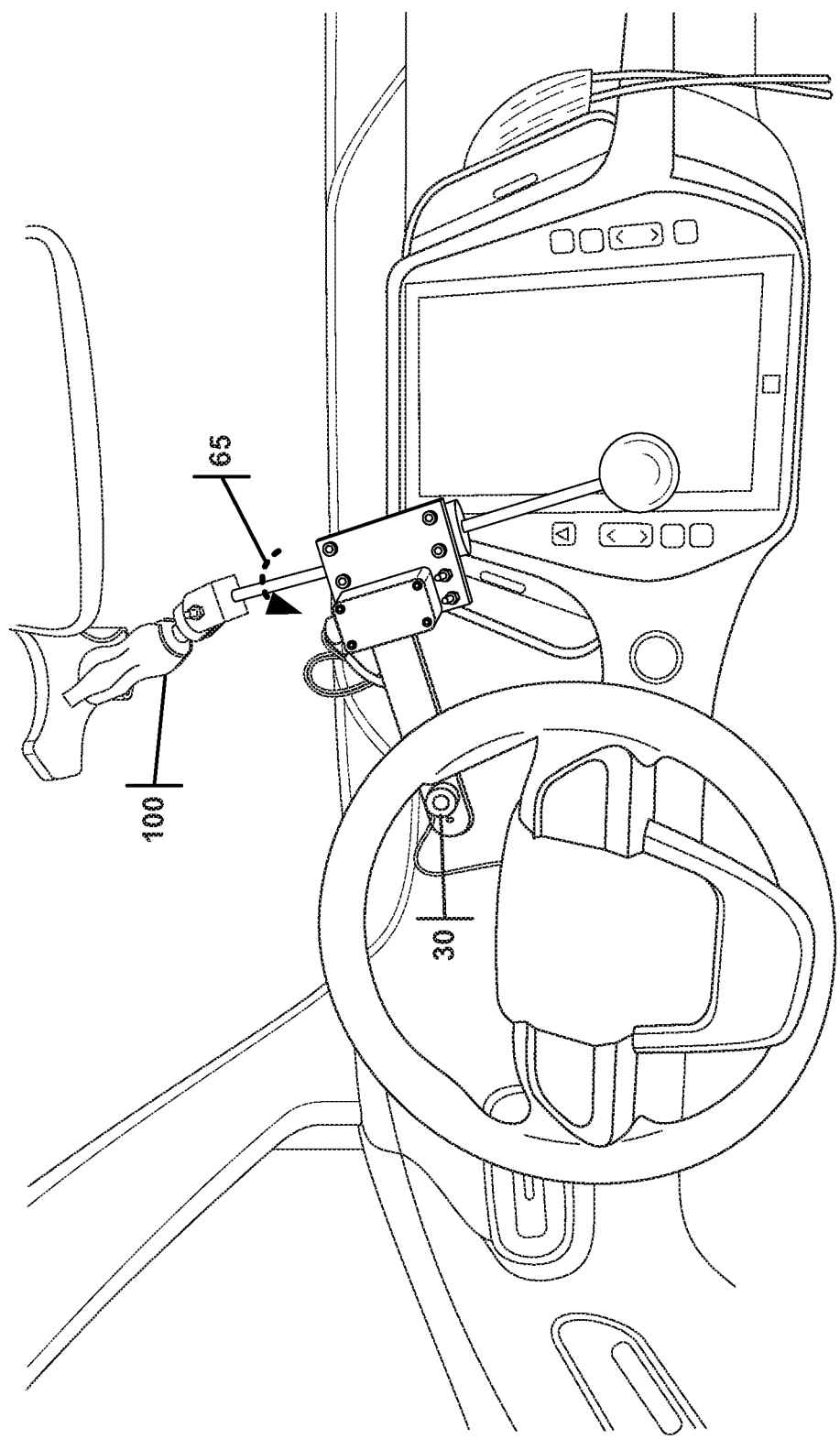
FIG. 10 is a line drawing from a photograph of the steering robot, taken a fraction of a second after FIG. 9, detached from the steering wheel.

A steering processor 75 is connected to the actuator 20 and to the electromechanical connector 30 and can control them both. By actuating the actuator 20, the processor 75 can operate the steering wheel 10 when the actuator 20 is connected to the steering wheel 10 by way of the electromechanical connector 30. This is shown by the robotic steering rotation 50 in FIG. 2 and by the opposite robotic steering rotation 55 in FIG. 3. By actuating the electromechanical connector 30, the processor 75 can disconnect 60 the actuator 20 from the steering wheel 10, as shown in FIG. 4A. The processor 75 may perform the actuation of the actuator 20 and then the actuation of the electromechanical connector 30 while the test automobile is being driven. FIGS. 7 through 11 illustrate the installation of the steering robot 5 on a test automobile. Further, FIGS. 8, 9 and 10, show the decoupling of the electromechanical connector 30 from the steering wheel 10, and each of these figures are illustrated fractions of a second apart from each other.

A compliant coupling 27 between the end of the actuator arm 25 and the attachment to the steering wheel 10 is optional. Some LKS systems determine driver attentiveness/alertness by monitoring steering wheel torque and angular variations. In some cases, a rigid coupling between the actuator arm 25 and the steering wheel 10 can be interpreted as an attentive driver, which may cause the LKS to suppress certain features and functions, including steering intervention, and may adversely affect the evaluation of the LKS. A compliant coupling 27 can be interpreted as a less attentive driver, such that the LKS will not suppress steering interventions. The compliant coupling 27 may further include an adjustable spring rate and preload, such that the compliance of the coupling can be tailored to suit the requirements of the evaluation.

Figure 4B:
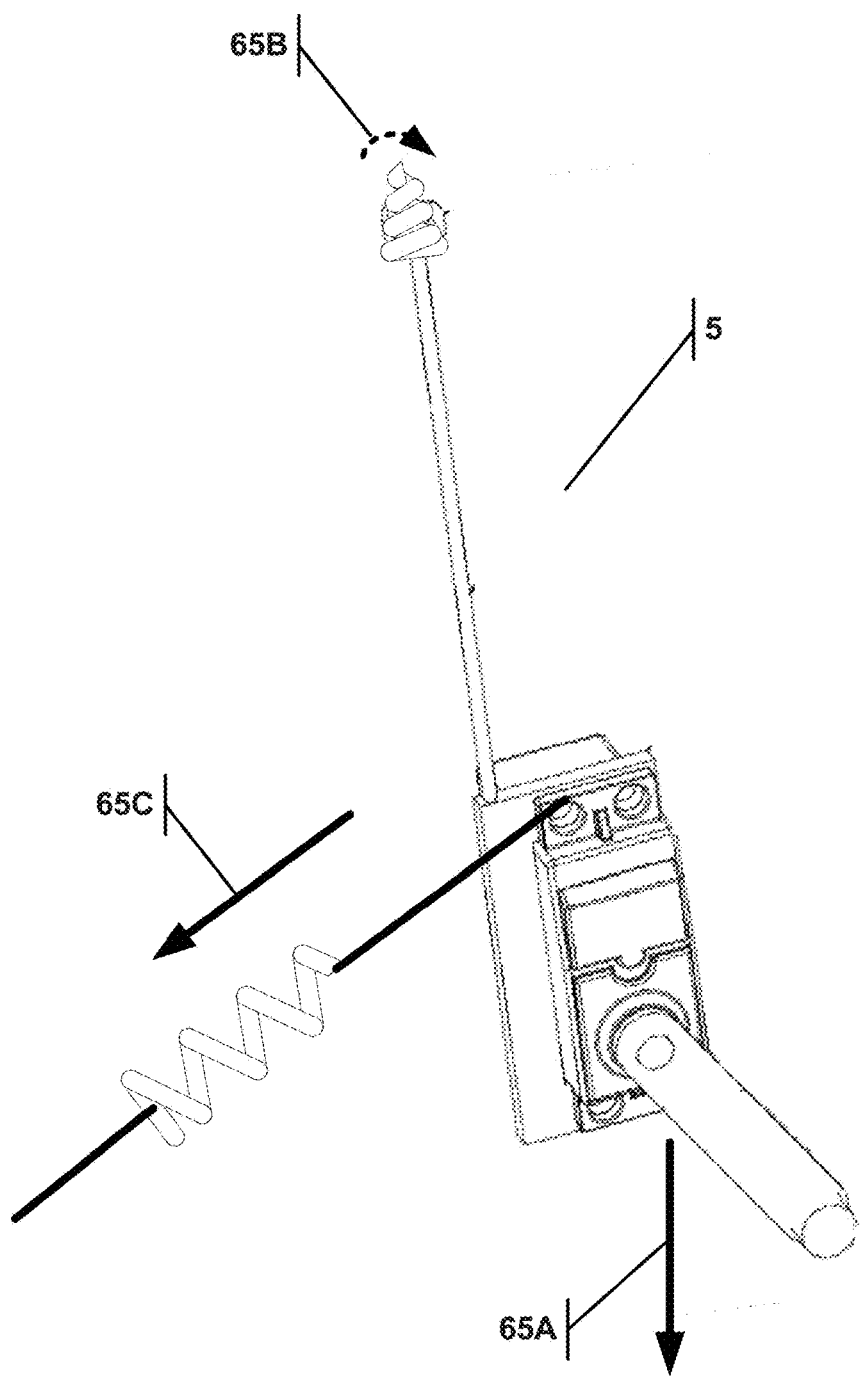
FIG. 4B illustrates the detachment forces acting on the steering robot.
Figure 11:
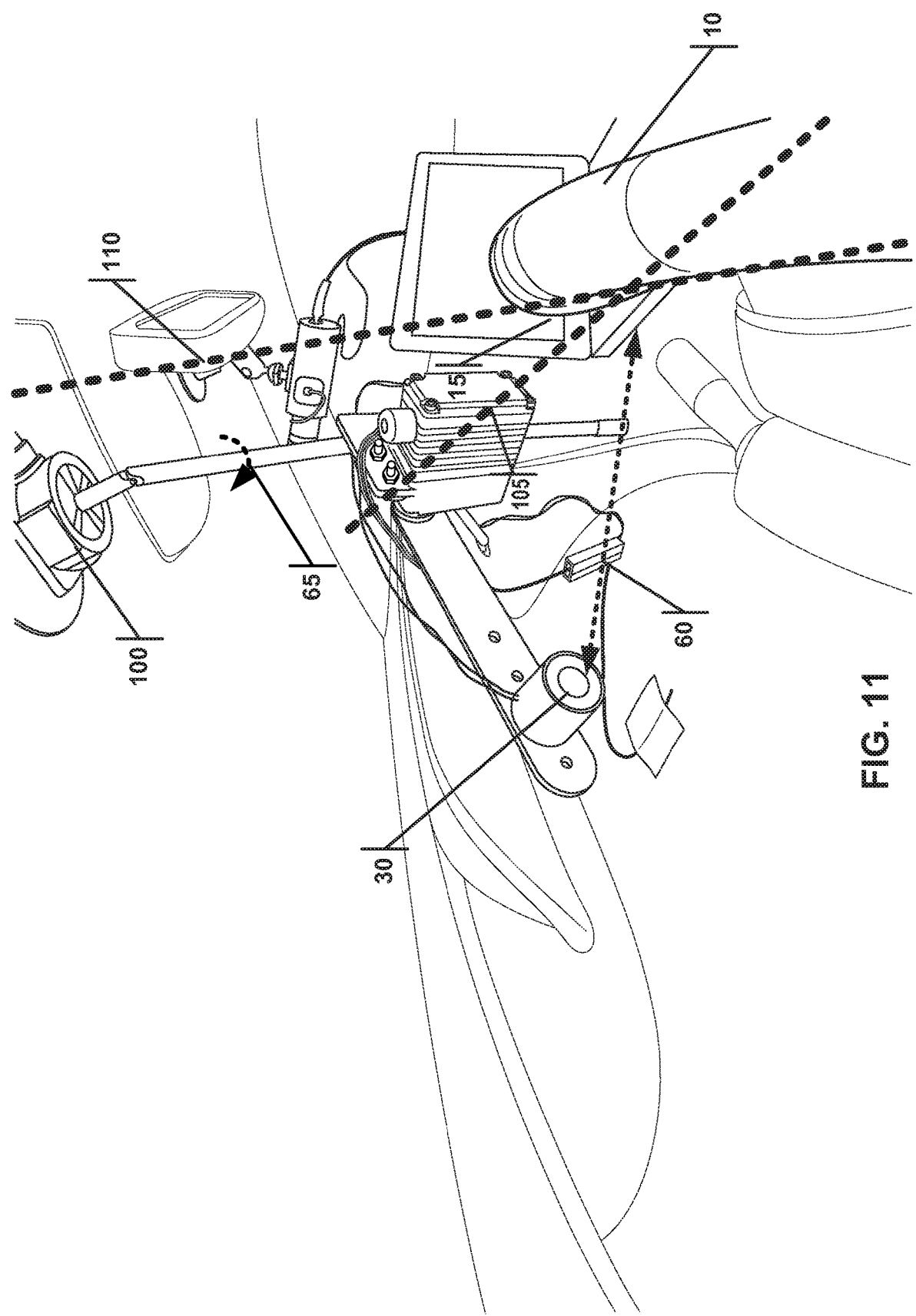
FIG. 11 is a line drawing from a photograph taken from the side of the steering wheel, showing the final position of the actuator and the actuator arm relative to the steering wheel after detachment.

It is preferred that, upon actuation and disconnection of the electromechanical connector 30, the actuator 20, including the actuator arm 25, moves away from the steering wheel 10 so as to prevent any interference with the steering wheel 10. To assist with this movement, the robot 5 and the actuator 20 may experience an actuator detachment force 65, but the connection of the actuator 20 to the steering wheel 10 by way of the electromechanical connector 30 is sufficient to overcome this force 65. Actuating the electromechanical connector 30 causes the actuator detachment force 65 to move the actuator 20 away 60 from the steering wheel 10, as shown in FIG. 4A. The detachment force 65 may be gravity 65A, a rotational spring bias 65B, a translational spring bias 65C, or combinations thereof, as shown in FIG. 4B. FIG. 11 also illustrates the actuator detachment 60 from the steering wheel bracket 15, which is caused by the actuator detachment force 65.

Because the steering robot 5 has mass, it also has self-inertia. Its self-inertia provides inertial loading when it is connected to the steering wheel 10. The actuator 20 also has internal resistance to rotation, and this is experienced in the form of a drag force when it is connected to the steering wheel 10. The steering robot's self-intertia, which appears as external inertia to the steering wheel 10, is there even when the steering robot 5 is turned off or deactivated. Because the test automobile's safety features attempt to direct the car in a safe direction, but can be overcome by a driver's slight torque on the steering wheel 10, this inertia and drag can skew the evaluation of the test automobiles safety features. Ideally, the steering wheel 10 should have as little external inertia and drag as possible to have a useful and unbiased evaluation. When the currently steering robot 5 actuates the electromechanical connector 30, the steering wheel 10 is decoupled from the external inertia and drag, allowing for the more accurate evaluation.

Figure 5A:
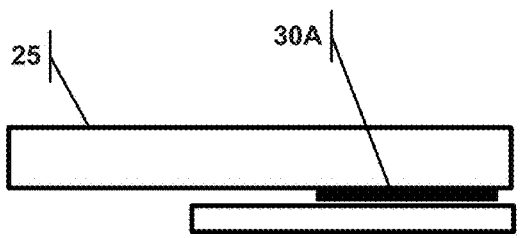
FIG. 5A illustrates a first embodiment of an electromechanical connector and steering wheel bracket.
Figure 5A:
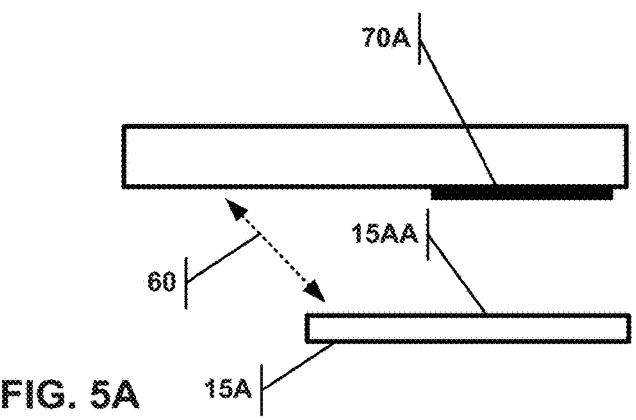
Figure 5B:
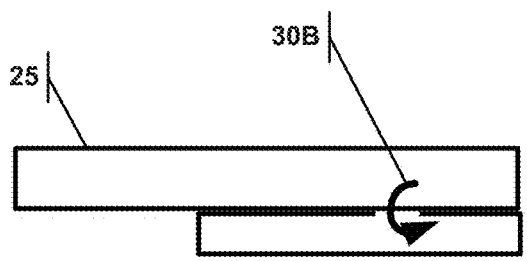
FIG. 5B illustrates a second embodiment of an electromechanical connector and steering wheel bracket.
Figure 5B:
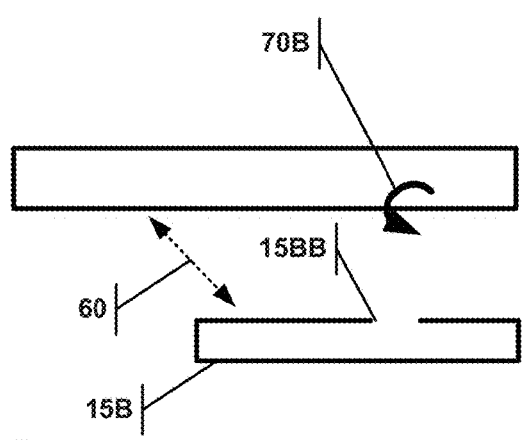
Figure 5C:
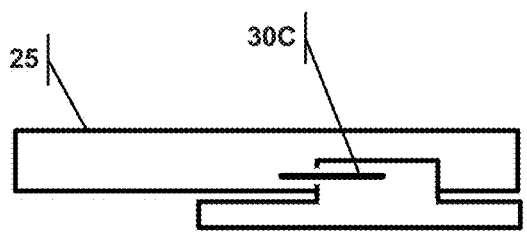
FIG. 5C illustrates a third embodiment of an electromechanical connector and steering wheel bracket.
Figure 5C:
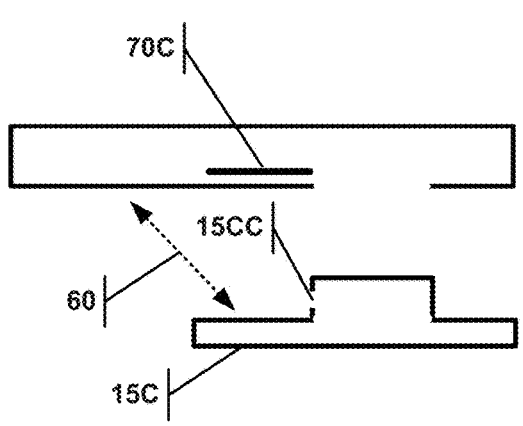
Figure 5D:
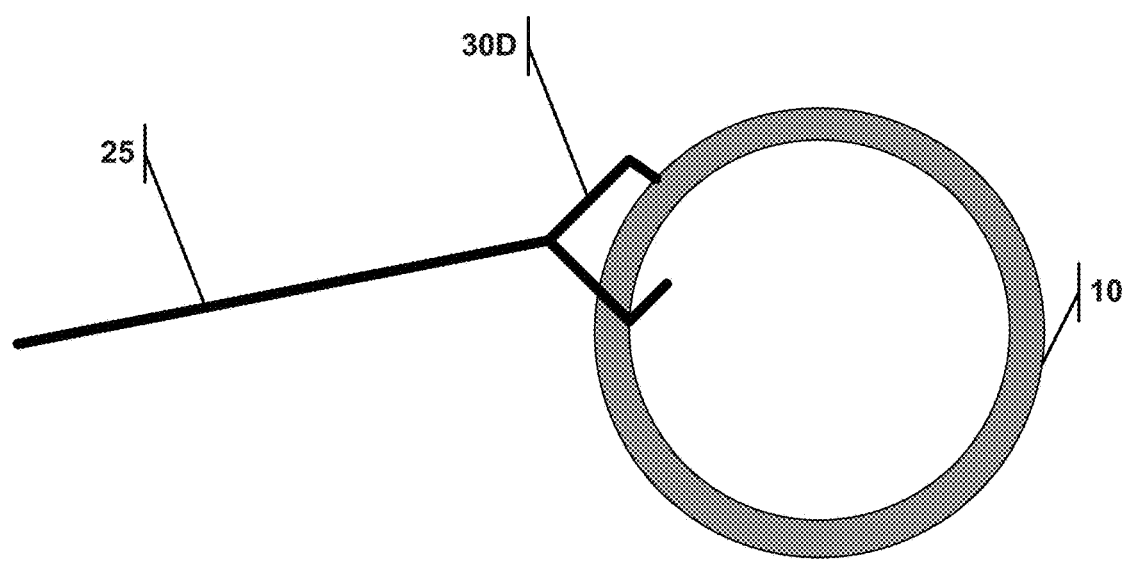
FIG. 5D illustrates a fourth embodiment of an electromechanical connector.
Figure 5D:
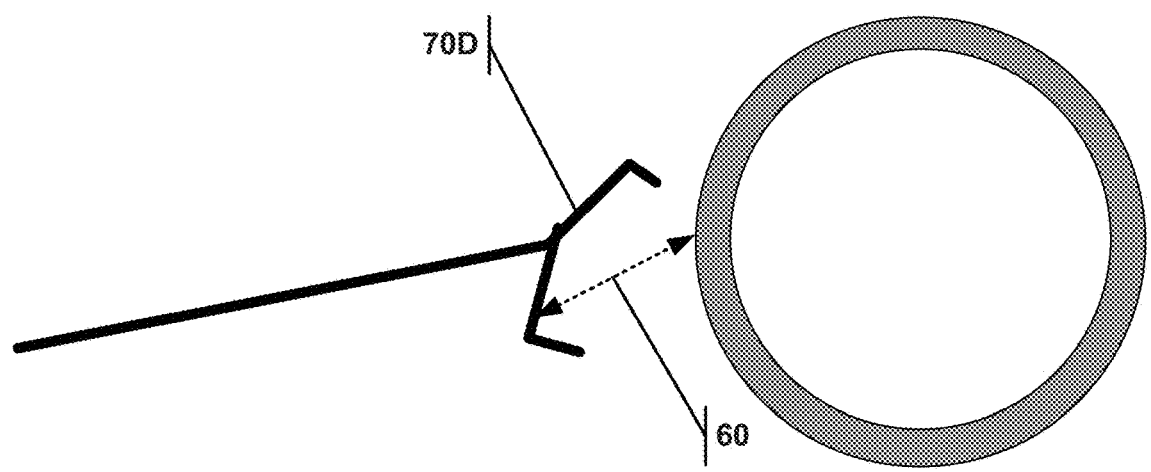

Turning now to FIGS. 5A through 5D, several electromechanical connectors (30A, 30B, 30C) are disclosed. FIG. 5A illustrates an electromechanical connector 30 that is an electromagnet 30A and attracted to a steering wheel bracket connection structure—i.e. a piece of metal 15AA—, which is part of the steering wheel bracket 15A. Actuating the electromechanical connector 30A comprises deactivation 70A of the electromagnet 30A such that the electromagnet 30A is not attracted to the piece of metal 15AA causing actuator arm detachment 60. FIGS. 5B and 5C illustrate electromechanical connectors that include a pin (30B, 30C) inserted into steering wheel bracket connection structures—i.e., slots (15BB, 15CC)—that are a part of the steering wheel brackets (15B, 15C). Actuating the electromechanical connectors (30B, 30C) removes the pin (70B, 70C) from the slots (15BB, 15CC). Finally, FIG. 5D illustrates an actuator arm 25A with an electromechanical connector that is a pincer 30D that can be actuated 70D to open and release 60 from the steering wheel 10.

In the embodiment just described, the actuator 20 is situated to the side of the steering wheel 10, such that its rotational axis is parallel to, but not coincident with, the rotational axis of the steering wheel 10. In this case, the electromechanical connector 30 may be situated on the forward side of the steering wheel 10 (i.e., the side opposite the driver) such that it can fall away from the steering wheel 10 under its own weight upon disconnect 60. In this embodiment, the rotational plane of the actuator 105 is not necessarily equal to the rotational plane of the steering wheel 110. This is shown in FIG. 11 where the rotational plane of the actuator when connected to the steering wheel 10 is shown as line 105, and the rotational plane of the steering wheel 10 is shown as line 110. Thus, trigonometric compensation must be applied to achieve the desired steering wheel angle, based upon the geometry of the particular installation.

In another embodiment, the actuator 20 is situated over the steering wheel 10, such that its rotational axis 105 is coincident with the rotational axis 110 of the steering wheel 10. In this case, the electromechanical connector 30 is situated on the rear side of the steering wheel 10 (i.e., the side nearest the driver). In this embodiment, it may be necessary to provide some means of biasing the actuator arm 25 away from the steering wheel 10, such that when the actuator 20 is disconnected from the steering wheel 10, it is moved slightly upward and away from the steering wheel 10. The structures disclosed in FIG. 4B may be used to accomplish this. In this embodiment, the actuator angle is equal to the steering wheel angle, and no additional angular compensation may be necessary.

Figure 6:
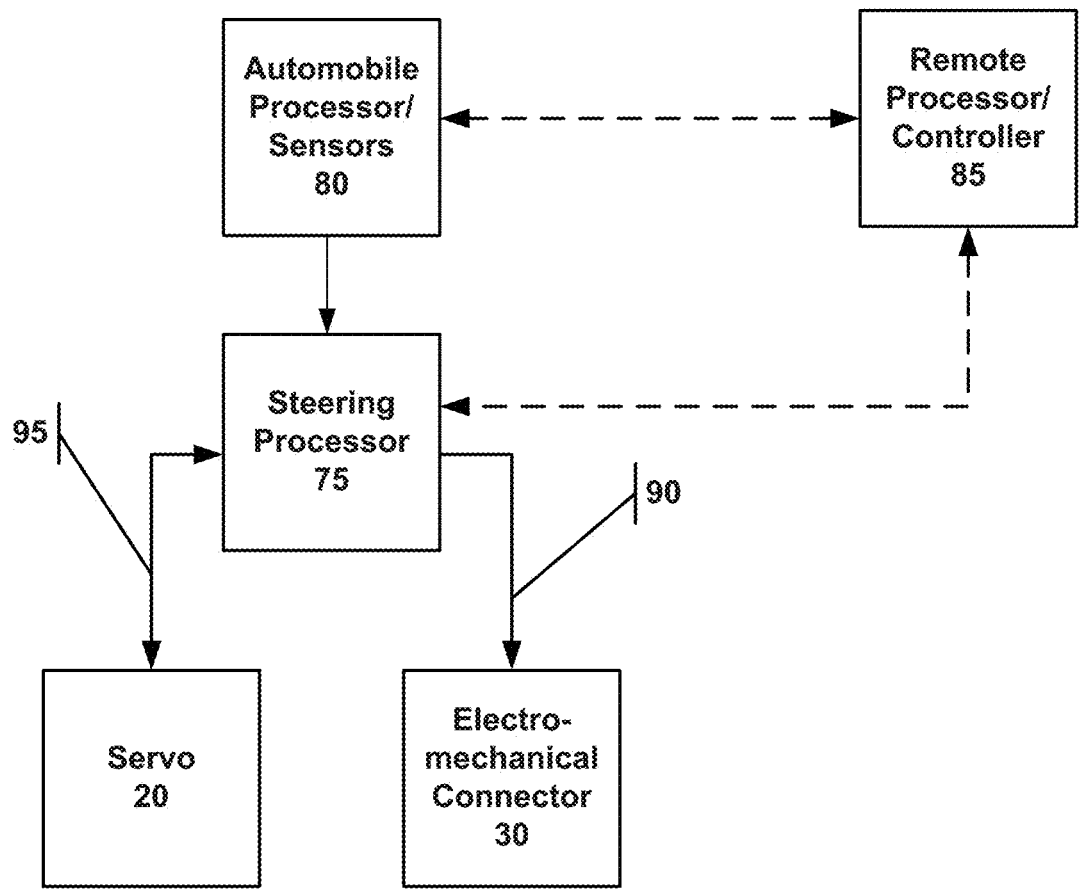
FIG. 6 is a diagram of the steering processor connected to the actuator and to the electromechanical connector and other processors.
Figure 7:
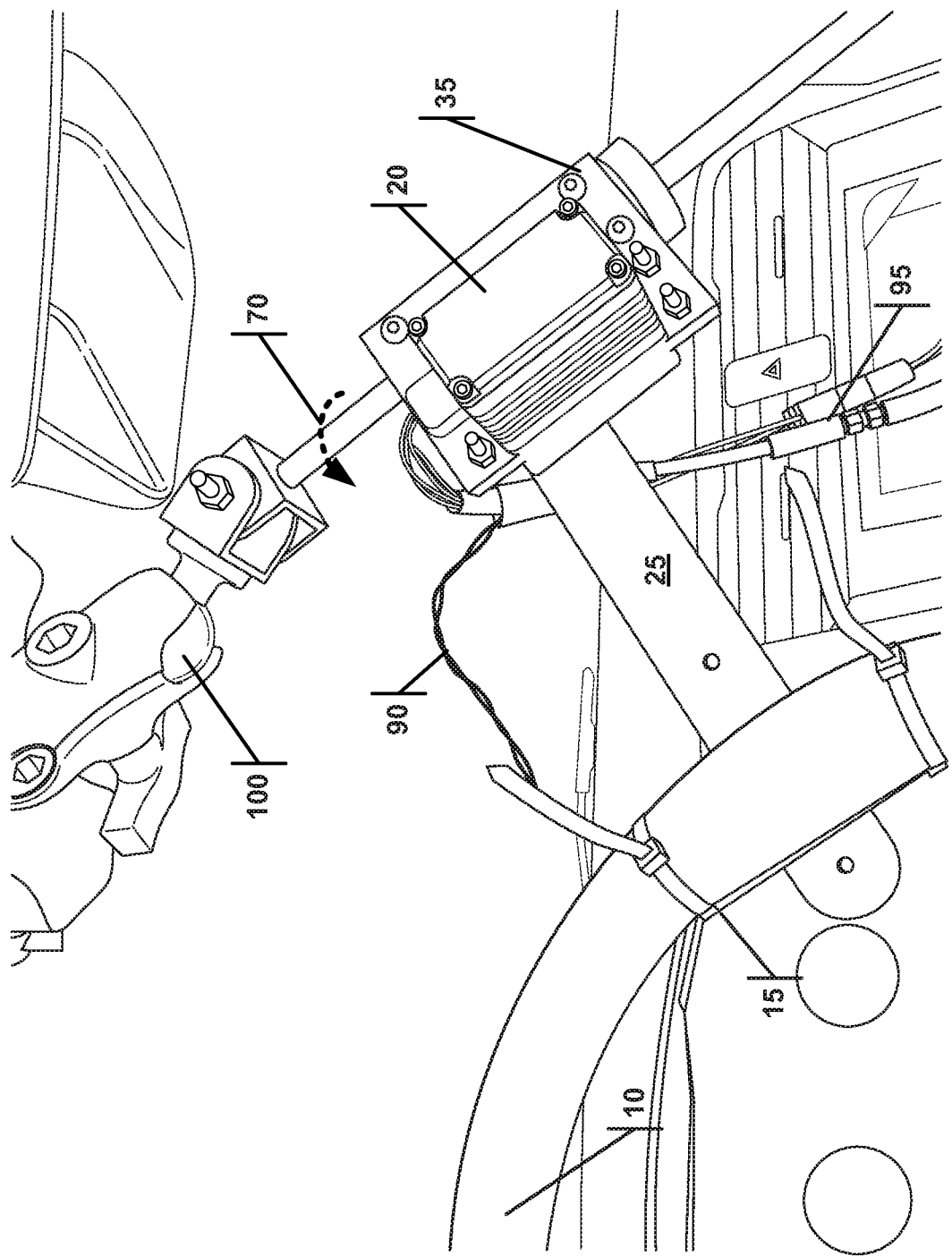
FIG. 7 is a line drawing from a photograph of the steering robot connected to a steering wheel by means of an electromechanical connector.

FIG. 6 illustrates a schematic of the processor control of the actuator 20 and the electromechanical connector 30. The steering processor 75 is connected to the actuator 20 via control line 95 and connected to the electromechanical connector 30 via control line 90. While these lines may be hard wired, they also may be wireless connections. The test automobile may also have an automobile processor 80 connected to automobile sensors. The steering processor 75 may be connected to the automobile processor 80. Finally, the operation of the steering robot 5 may be accomplished either fully or partially by a remote control 85 connected to the steering processor 75 through a wireless signal. The remote control 85 may be external to the test automobile.

Figure 12A:
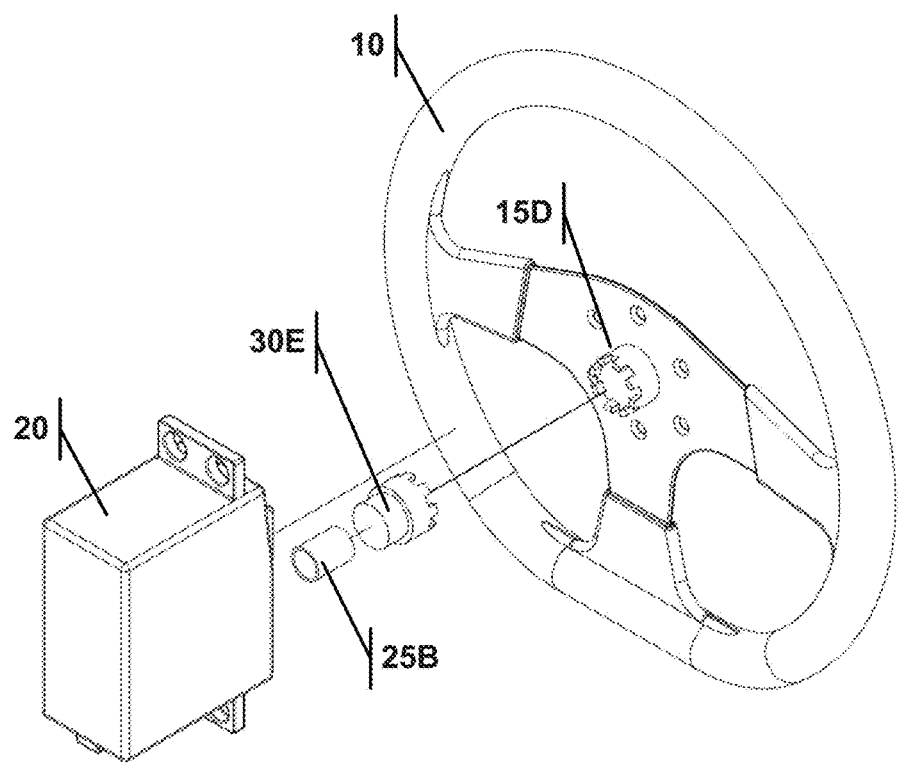
FIG. 12A shows the steering robot attached to a steering wheel by means of an electromechanical connector and an actuator shaft.
Figure 12B:
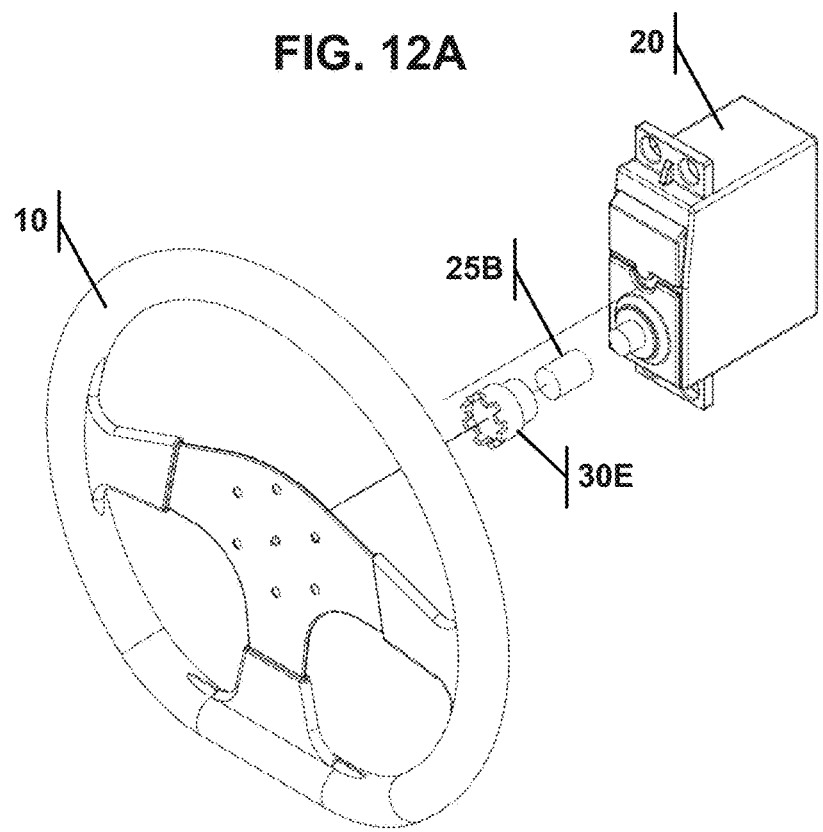
FIG. 12B is another perspective of the steering robot of FIG. 12A.

FIGS. 12A and 12B illustrate the use of an actuator shaft 25B as the connection structure. The actuator 20 is connected to an actuator shaft 25B that has the electromechanical connector 30E that engages a steering wheel bracket (shaft coupler) 15D connected to the steering wheel 10. The electromechanical connector 30E and the steering wheel bracket (shaft coupler) 15D may have complementary teeth structures to allow for high torque of the actuator 20 without the connection between the actuator 20 and the steering wheel 10 experiencing slippage. The electromechanical connector 30E may be an electromagnet that maintains the actuator shaft in connection with the steering wheel bracket (shaft coupler) 15D.

Figure 12C:
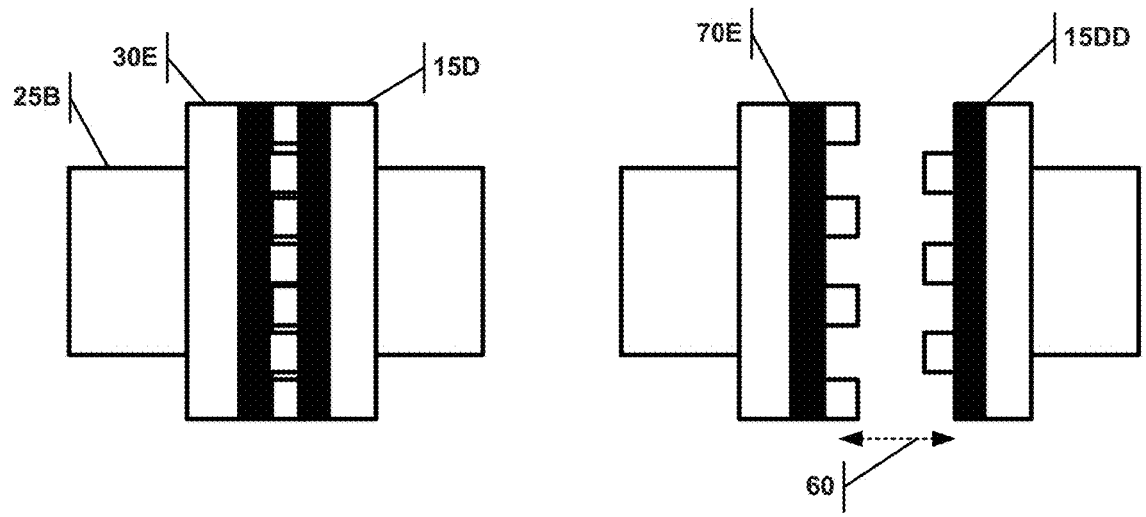
FIG. 12C illustrates an electromechanical connector and a steering wheel bracket for the actuator shaft embodiment.
Figure 12D:
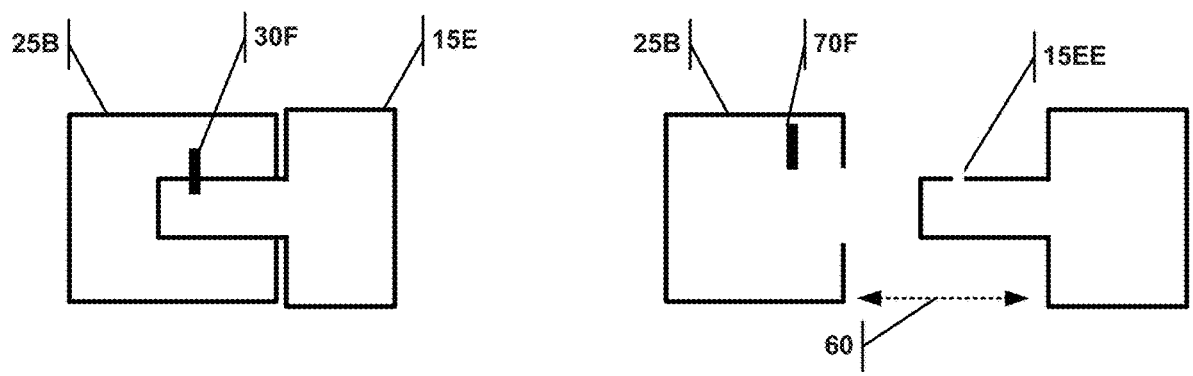
FIG. 12D illustrates an electromechanical connector and a steering wheel bracket for the actuator shaft embodiment.

FIGS. 12C and 12D illustrate electromechanical connectors for the actuator shaft 25B. FIG. 12C illustrates an electromechanical connector that is an electromagnet 30E attracted to a steering wheel bracket connection structure—i.e., a piece of metal 15DD—that is part of the steering wheel bracket (shaft coupler) 15D. Actuating the electromechanical connector 30E comprises deactivation 70E of the electromagnet 30E such that the electromagnet 30E is not attracted to the piece of metal 15DD, causing actuator shaft detachment 60. FIG. 12D illustrates an electromechanical connector that includes a pin 30F inserted into the steering wheel bracket connection structure slot 15EE that is a part of the steering wheel bracket 15E. Actuating the electromechanical connector 30F removes the pin 70F from the slot 15EE.

Figure 13:
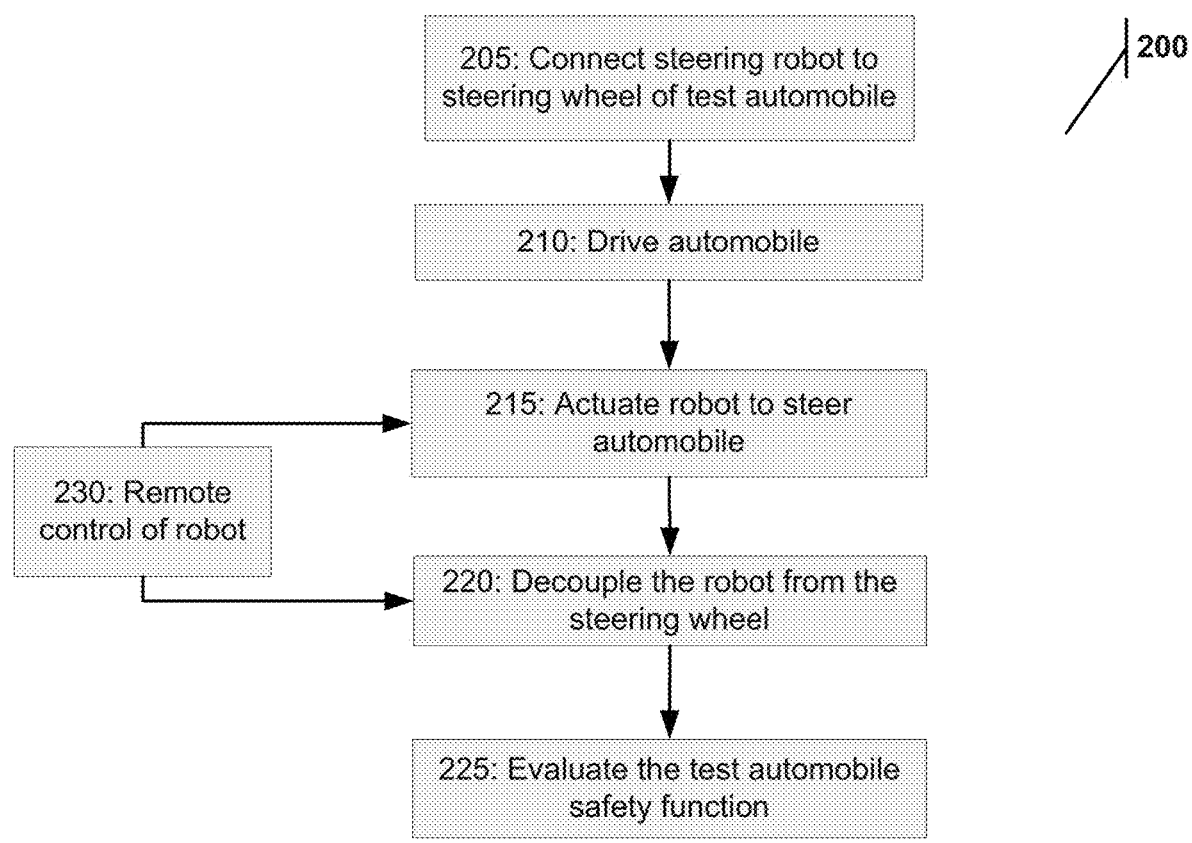
FIG. 13 is method of evaluating the free response of a test automobile's safety functions using the steering robot.

FIG. 13 illustrates a method 200 of evaluating the free response of a test automobile's safety functions using the steering robot. In step 205, a steering robot 5 is connected to a steering wheel 10 of the test automobile, the robot 5 having its own inertia such that the inertia is coupled to the steering wheel 10. The test automobile is driven (step 210) and while the automobile is driven, the robot 5 is actuated to operate the steering wheel 10 at step 215. This actuation may be sufficient to direct the test automobile out of its current driving lane. Also while driving, the robot 5 decouples 60 from the steering wheel 10, thereby decoupling its own inertia from the steering wheel 10, in step 220. Now the results of the free response of a test automobile's safety functions may be evaluated at step 225. Optionally, the operation of the steering robot 5 could be performed remotely (step 230). The robot 5 used in method 200 may be the steering robot 5 detailed above. The test automobile's safety functions may include, but are not limited to, a lane keeping system, an autonomous driving system and a semi-autonomous driving system.

The invention has been described in connection with specific embodiments that illustrate examples of the invention but do not limit its scope. Unless indicated otherwise, any feature, aspect or element of any of these example embodiments may be removed from, added to, combined with or modified by any other feature, aspect or element. As will be apparent to persons skilled in the art, modifications and adaptations to be above-described example embodiments of the invention can be made without departing from the spirit and scope of the invention, which is defined only by the following claims.

The invention claimed is:

1. A steering robot for operating a steering wheel of a test automobile, the robot comprising:
    an actuator mounted to the automobile;
    an electromechanical connector that detachably connects the actuator to the steering wheel; and
    a steering processor connected to the actuator and to the electromechanical connector, the steering processor adapted to perform the steps of:
        (1) actuating the actuator, thereby operating the steering wheel when the actuator is connected to the steering wheel by way of the electromechanical connector; and
        (2) actuating the electromechanical connector, thereby disconnecting the actuator from the steering wheel.

2. The steering robot of claim 1, further comprising a connection structure that transfers a torque from the actuator to the steering wheel, wherein the connection structure is selected from a group consisting of: an actuator arm, a shaft, or a plate.

3. The steering robot of claim 2, wherein the connection structure is connected to the actuator and to the electromechanical connector.

4. The steering robot of claim 2, wherein the connection structure is compliant.

5. The steering robot of claim 1, wherein the actuator is connected to the automobile by a bracing rod and an automobile mount.

6. The steering robot of claim 5, wherein the automobile mount comprises a suction cup.

7. The steering robot of claim 1, wherein the electromechanical connector comprises an electromagnet attracted to a piece of metal.

8. The steering robot of claim 7, wherein the actuation of the electromechanical connector comprises deactivation of the electromagnet such that the electromagnet is not attracted to the piece of metal.

9. The steering robot of claim 1, wherein the electromechanical connector comprises a pin inserted into a slot.

10. The steering robot of claim 9, wherein the actuation of the electromechanical connector comprises removing the pin from the slot.

11. The steering robot of claim 1, wherein the electromechanical connector comprises a pincer that grasps the steering wheel.

12. The steering robot of claim 1, wherein the actuator experiences an actuator detachment force, and wherein the connection of the actuator to the steering wheel is sufficient to overcome the force.

13. The steering robot of claim 12, wherein the actuation of the electromechanical connector causes the actuator detachment force to move the electromechanical connector away from the steering wheel.

14. The steering robot of claim 13, wherein the detachment force is selected from the group consisting of: gravity, rotational spring bias, translational spring bias, and combinations thereof.

15. The steering robot of claim 1, wherein the test automobile comprises an automobile processor connected to automobile sensors, wherein the steering processor is connected to the automobile processor.

16. The steering robot of claim 1, further comprising a remote control connected to the steering processor through a wireless signal.

17. The steering robot of claim 1, wherein the robot has self-inertia, and when the robot is connected to the steering wheel, the steering wheel experiences the robot's self-inertia.

18. The steering robot of claim 17, wherein actuating the electromechanical connector decouples the robot's self-inertia from the steering wheel.

19. The steering robot of claim 1, wherein the processor performs step (1) and then step (2) while the test automobile is moving.

20. The steering robot of claim 1, wherein the steering wheel comprises a first rotational plane and the actuator comprises a second rotational plane when the actuator is connected to the steering wheel, and wherein the first plane is different from the second plane.

21. The steering robot of claim 1, wherein the steering wheel comprises a first rotational plane and the actuator comprises a second rotational plane when the actuator is connected to the steering wheel, and wherein the first plane is within the second plane.

22. The steering robot of claim 1, wherein the actuator is selected from a type consisting of: hydraulic, pneumatic, mechanical, electrical, thermal, magnetic, vacuum, and combinations thereof.

23. A method for testing a test automobile's safety functions, the method comprising the steps of:
 a. providing a steering robot connected to a steering wheel of the test automobile, the robot comprising:
  an actuator mounted to the automobile, and
  an electromechanical connector that detachably connects the actuator to the steering wheel; wherein the actuator and electromechanical connector have an inertia that is coupled to the steering wheel;
 b. driving the test automobile;
 c. while driving, actuating the actuator to operate the steering wheel;
 d. while driving, actuating the electromechanical connector to decouple the robot from the steering wheel thereby decoupling the inertia from the steering wheel; and
 e. evaluating the automobile safety functions.

24. The method of claim 23, wherein the automobile safety function is selected from a group consisting of: a lane keeping system, an autonomous driving system or a semi-autonomous driving system.

25. The method of claim 23, wherein the actuation of the robot in step (c) is sufficient to direct the test automobile out of its current lane.

26. The method of claim 23, wherein steps (c), and (d) are controlled by a processor.

27. The method of claim 26, wherein the processor is not on board the test automobile.

* * * * *